(12) United States Patent
Balster et al.

(10) Patent No.: US 10,072,709 B2
(45) Date of Patent: Sep. 11, 2018

(54) CARRIER ROLLER BEARING SYSTEM OF A CARRIER ROLLER OF A ROLLER HEARTH FURNACE, CARRIER ROLLER HANDLING SYSTEM FOR SWITCHING ROLLER BEARINGS AND PROCESS FOR SWITCHING ROLLER BEARINGS

(71) Applicant: LOI Thermprocess GmbH, Essen (DE)

(72) Inventors: Frank Balster, Nottuln (DE); Horst Wachholder, Essen (DE)

(73) Assignee: LOI THERMPROCESS GMBH, Essen (DE)

( * ) Notice: Subject to any disclaimer, the term of this patent is extended or adjusted under 35 U.S.C. 154(b) by 229 days.

(21) Appl. No.: 15/000,612

(22) Filed: Jan. 19, 2016

(65) Prior Publication Data
US 2016/0208859 A1  Jul. 21, 2016

(30) Foreign Application Priority Data

Jan. 20, 2015  (EP) .................................. 15 151 782
Jan. 21, 2015  (EP) .................................. 15 151 976
(Continued)

(51) Int. Cl.
*B23P 19/10*  (2006.01)
*F16C 35/06*  (2006.01)
(Continued)

(52) U.S. Cl.
CPC ............ *F16C 35/062* (2013.01); *F16C 19/54* (2013.01); *F27B 3/10* (2013.01); *F27B 9/2407* (2013.01);
(Continued)

(58) Field of Classification Search
CPC .......... B23Q 1/00; B23Q 1/0063; B23Q 1/03; B23Q 1/25; B23Q 1/28; B23Q 3/00
See application file for complete search history.

(56) References Cited

U.S. PATENT DOCUMENTS 3,787,039 A * 1/1974 Zeichman ............. B25B 11/005
108/150
4,295,257 A * 10/1981 Strohs ..................... B23P 19/04
269/43
(Continued)

FOREIGN PATENT DOCUMENTS

DE   10 2008 012739    9/2009
DE   10 2011 079 771   1/2013
(Continued)

OTHER PUBLICATIONS

European Search Report filed in EP 15 15 2140 dated Jun. 8, 2016.
(Continued)

*Primary Examiner* — Lee D Wilson
(74) *Attorney, Agent, or Firm* — Rankin, Hill & Clark LLP

(57) ABSTRACT

A roller bearing handling system for replacement or exchange of a roller bearing of a roller hearth furnace includes a base support, a pivot support arranged on the base support, and a first roller bearing handling element arranged or placed on the pivot support and which can lift a roller bearing. The pivot support is arranged on the base support and is able to swivel about a stationary pivot point relative to the base support. A second carrier roller bearing handling element is arranged on the base support for handling a roller bearing and is able to be adjusted between a handling position, in which the second roller bearing handling element can mechanically couple and connect in a form-locking manner with the roller bearing for roller bearing replacement and a release position in which the mechanical
(Continued)

coupling and form-locking connection between the roller bearing and the carrier roller bearing handling element is released is released.

13 Claims, 4 Drawing Sheets

(30) Foreign Application Priority Data

| | | | |
|---|---|---|---|
| Jan. 22, 2015 | (EP) | ................................... | 15 152 140 |
| Jan. 30, 2015 | (EP) | ................................... | 15 153 283 |

(51) Int. Cl.
*F16C 19/54* (2006.01)
*F27B 3/10* (2006.01)
*F27B 9/24* (2006.01)
*F27B 9/30* (2006.01)
*F27D 9/00* (2006.01)

(52) U.S. Cl.
CPC ........ *F27B 9/30* (2013.01); *F27D 2009/0021* (2013.01)

(56) References Cited

U.S. PATENT DOCUMENTS

| 5,673,843 | A | * | 10/1997 | Gainey | .............. | B23K 37/0533 |
|---|---|---|---|---|---|---|
| | | | | | | 228/44.5 |
| 2008/0199116 | A1 | * | 8/2008 | Tamura | ................... | F16C 13/02 |
| | | | | | | 384/419 |
| 2011/0185793 | A1 | | 8/2011 | Harrison | | |
| 2016/0208859 | A1 | * | 7/2016 | Balster | .................. | F16C 35/062 |

FOREIGN PATENT DOCUMENTS

| EP | 0 033 845 | 8/1981 |
|---|---|---|
| FR | 2 742 854 | 6/1997 |
| FR | 2 966 553 | 4/2012 |
| JP | 2003-156287 | 5/2003 |
| KR | 2003 0053400 | 6/2003 |
| WO | 2013/152419 | 10/2013 |

OTHER PUBLICATIONS

European Search Report filed in EP 15 15 3283 dated Jun. 10, 2016.
European Search Report filed in EP 15 15 1976 dated Jun. 8, 2016.

\* cited by examiner

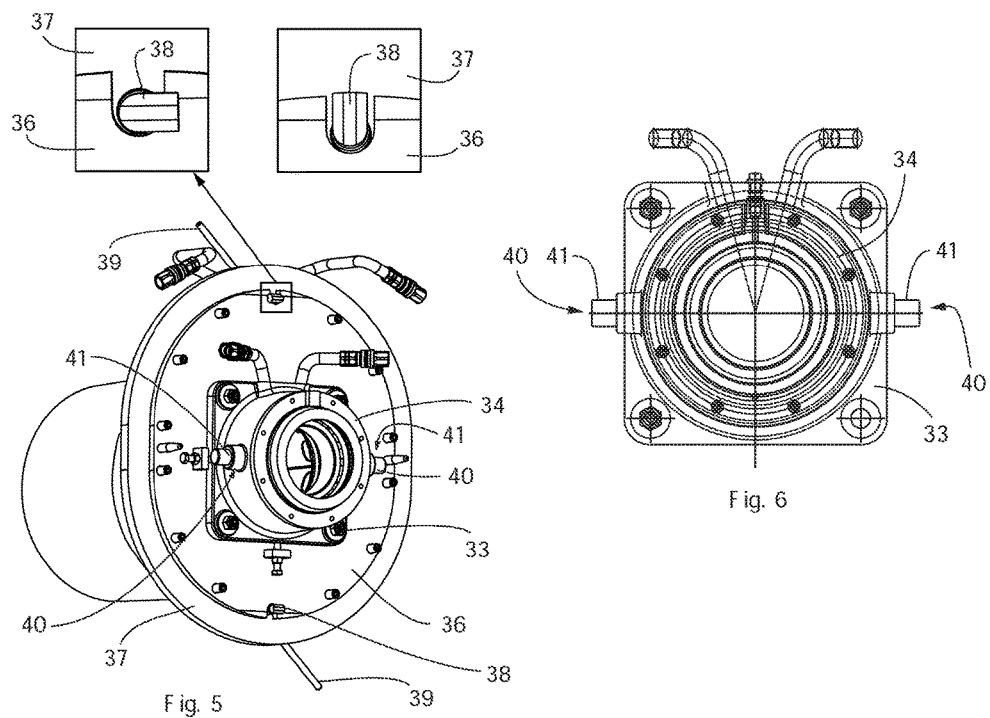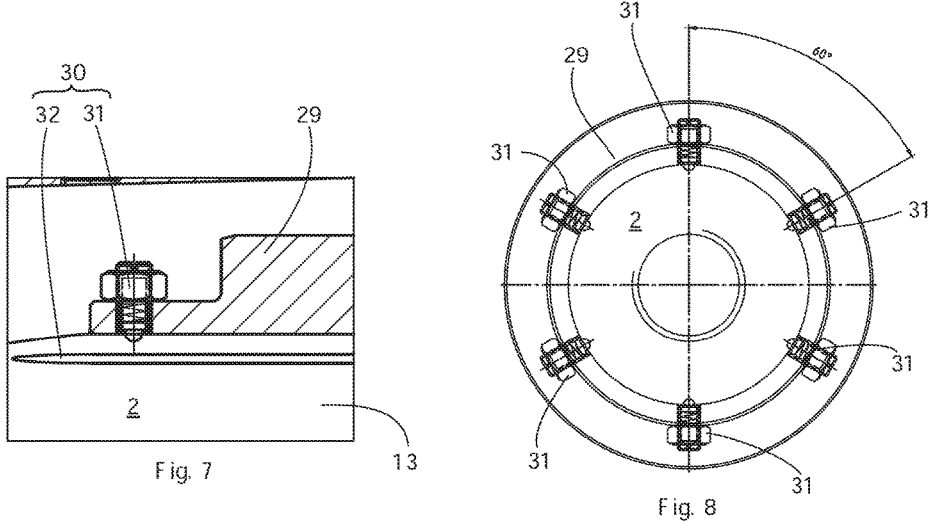

CARRIER ROLLER BEARING SYSTEM OF A CARRIER ROLLER OF A ROLLER HEARTH FURNACE, CARRIER ROLLER HANDLING SYSTEM FOR SWITCHING ROLLER BEARINGS AND PROCESS FOR SWITCHING ROLLER BEARINGS

BACKGROUND

The invention relates to a carrier roller bearing system of a carrier roller of a roller hearth furnace, that is provided with a first bearing element, that can be attached to the first side panel, and also provided with a second bearing element, that can be attached to the second side panel that lies on the side opposite to the first side panel, a carrier roller bearing that can be rotated and stored in the roller hearth furnace with its first longitudinal end by means of the first bearing element and with its second longitudinal end by means of the second bearing element, whereby a shaft journal extends or protrudes externally towards the outside from the first bearing element, which can be connected for drive purposes with a driving unit.

Furthermore the invention relates to a carrier roller handling system for switching a carrier roller of a roller hearth furnace that is provided with a base support, a pivot support that is attached to the base support and a first roller handling system, that is attached to the pivot support and can lift or raise a carrier roller.

Finally the invention relates to a process for switching or exchanging carrier rollers of a roller hearth furnace that is provided with a carrier roller bearing system, by means of a carrier roller handling system, in which the carrier roller bearing system is driven sideways near the roller hearth furnace to the position of the carrier bearing that is to be dismantled or dismounted, the shaft journal of the roller bearing that is to be dismounted is decoupled, then the carrier roller handling system is backed up to the carrier roller that is to be dismounted and then a fastener or fixation of the first bearing element is disengaged or detached from the roller hearth furnace.

A carrier roller bearing system of the type identified at the outset is for example known from the patent DE 10 2011 079 771 A1, from which a carrier roller handling system as well as the process of the type identified at the outset are to be learnt.

Roller hearth furnaces, which are also known as continuous furnaces and are used for example in continuous annealing or homogenization plants, use a number of carrier or conveyor rollers that transport the items or piece goods that are to be heat-treated through the roller hearth furnace. While heat treating steel materials in the temperature range of around 800° C., the upper surfaces of the roller bearings tilt to enable the formation of irregular, firm coatings, which are difficult to remove. While doing so, with the increasing thickness of the coating on the surface of the carrier rollers grows the risk, that the irregularities get imprinted on the steel and leave undesired patters on the items or product that can especially lead to product defects in the following manufacturing process. The operators of these kinds of plants with roller hearth furnaces are hence compelled to interrupt the oven operation for carrying out expensive cleaning measures repeatedly and for longer times. However a defect in one carrier roller so far led to the entire oven needing to be shut down and cooled, in order to replace the defective roller bearing with a new roller bearing. Such a replacement of roller bearings can for example last for one or more days, something which involves a significant loss of production.

The patent DE 10 2011 079 771 A1 does not provide any design engineering details regarding the manner in which a replacement of roller bearings can be realized as efficiently as possible; but rather a concept, according to which a roller bearing exchange can be implemented by means of a roller bearing handling device that is moveable on the side near the roller hearth oven and it drives a lance into the hollow roller bearing that needs to be changed and lifts this roller bearing out of the oven. Such concepts that implement the roller bearing change by means of especially designed and constructed devices that are arranged laterally near the roller heath furnace, are however known from prior art. For example the document DE 40 41 217 A1 describes a continuous oven, in which the roller bearings that are driven are made of liquid cooled core pipes and the core pipes are provided with heat insulating systems. In this continuous oven, only the heat insulating systems are replaced. The core pipes remain inside the oven during the change. In this, a pulling-out and inserting device pulls the insulating system laterally out of the oven and subsequently inserts a new insulating system over the core pipes that are arranged in the oven as before. In both cases, the exchange of a roller bearing is however associated with significant operational interruptions and consequently with losses of production.

SUMMARY

The invention is based on the object of finding a solution that facilitates with a simple style of design, a roller bearing system and a roller bearing handling device that acts jointly with it as well as a process for replacing roller bearings of the roller bearing system using the roller bearing handling device, through which the expenditure of maintenance and the expenditure on replacement of roller bearings can be reduced and the operational breakdowns of the roller hearth oven can be reduced to a minimum.

In a roller bearing system of the type identified at the outset, the object is achieved according to the invention in the following way: the first bearing element at least has one handling element meant for handling of the roller bearing that can be mechanically coupled and can be connected in a form-locking way for replacement of a roller bearing with a roller bearing handling device in order to pull out the roller bearing together with the first bearing element from the roller hearth oven or in order to insert the roller bearing together with the first bearing element in the roller hearth oven.

Furthermore, in a roller bearing handling system of the type identified at the outset, the object is achieved in the following way: the swivel bracket is arranged on the base support so that it can be rotated around a stationary pivot point relative to the base support, whereby a second roller bearing handling element is affixed on the base support for handling a roller bearing, that is adjustable between a handling position in which the second roller handling element can be connected in a form-locking manner and can be mechanically coupled with the roller bearing for replacement of the roller bearing, and a stowed or release position in which the mechanical coupling and the form-locking connection between the roller bearing and the second roller handling element are released.

Finally in a process of the type identified at the outset, the object is achieved in the following way: a form-locking connection is created between the second roller handling element and the (at least one) handling element of the first bearing element of the roller bearing that is to be demounted and the roller bearing handling device is subsequently moved away from the roller hearth oven so that the roller bearing that is to be demounted or dismantled is removed out of the roller hearth oven.

Advantageous and purposeful embodiments and further advantageous modifications of the invention are the subject matter of the subclaims.

The invention makes it possible to remove roller bearings of a roller hearth oven with simple means in a relatively short time and replace them with new roller bearings. The roller bearing that is to be demounted and the roller bearing that is to be subsequently fitted in its place are among other things held securely in their respective handling elements of the first roller handling element and the second roller handling element, in which the form-locking connection prevents the slipping off of the roller bearing during the transportation of the roller bearing in a secure manner, which happens in the case of the lances that are provided in the current state of the art. Moreover the form-locking connection ensures that the motion control of the roller bearing and the load pick up of this roller bearing are affected by the roller bearing handling device alone. The roller bearing system according to the invention corresponds to related products or creations, since the handling element of a roller bearing of the roller bearing system works in cooperation with the second roller handling element of the roller bearing handling device during demounting and mounting.

For an especially advantageous possibility constructively, that serves as the form-locking connection between the roller bearing handling device and the roller bearing, the invention provides in the design of the carrier roller bearing system that at least one handling system involves a cone-shaped coupling element externally on the first bearing element, that are preferably arranged diametrically to each other. These are diametrically arranged to each other in the case of two coupling elements. It is also conceivable that more than two coupling elements or also only one single coupling element can be provided externally on the first bearing element. In case of an even number of coupling elements it is preferable that the pairs of these are arranged diametrically to each other.

Furthermore the invention provides in the design of the roller bearing system that the cone shaped coupling elements extend laterally from the first roller bearing element outwards essentially parallel to the wall of the roller hearth oven and horizontally. On the one hand, the coupling elements form a form-locking connection with the roller bearing handling device, so that it can pull out the roller bearing with the help of the form-locking connection from the roller hearth furnace. On the other hand, the coupling elements also form an axis of rotation, around which the roller bearing can be swiveled with the help of the first roller handling element, and this collectively enables the roller bearing to be lifted off and dropped.

Heat treatment process of work pieces inside the roller hearth furnace can be carried out under protective atmospheres. In order to prevent air from penetrating the interior of the oven or protective gas from inside the oven to escape during the operation, the invention provides in the design of the roller bearing system that the roller bearing extends through its respective sealing plug that is in each case located in a respective opening of the corresponding side wall of the roller hearth oven. The sealing plugs ensure the necessary seal tightness with the flange connections arranged on them.

For increasing the sealing efficacy and for attaining a deadlock of the sealing plugs in the corresponding opening of the roller hearth furnace it is particularly advantageous if each sealing plug is developed with conical openings and if the roller bearing has conical sections through which the profile or cross section tapers in, in which the conical sections are at least arranged in sections in the respective seal plugs. The conical formation is primarily meant to stop the radiated heat from the inside of the roller hearth furnace from directly radiating to the roller bearing element arranged outside.

In order to avoid jamming of the roller bearing that is to be dismounted or mounted, the invention provides in further design of the roller bearing system that the second bearing element has an inspection window for visual monitoring of a roller bearing exchange. It can be monitored from the inspection window as to whether the roller bearing that is to be demounted has been detached or disengaged or whether the roller bearing that is to be mounted has been inserted into the second bearing element or whether the roller bearing that is to be mounted or dismounted is moved horizontally out of or into the oven.

The supervision through the inspection window can take place by a person, who must stay for this at the inspection window. A monitoring that is significantly more efficient can take place by arranging a monitoring camera for visual monitoring of the roller bearing change in a removable manner at the monitoring window of the second bearing element for visual monitoring of a roller bearing change.

In order to ensure an efficient change of roller bearings, in further developments of the roller bearings system according to the invention it is provided that the first bearing element has a fixed bearing and the second bearing element has a floating or moveable bearing.

In further developments of the roller bearing system the invention provides that the second bearing element has a rotatable bearing sleeve that is connected with the second longitudinal side of the roller bearing by means of a torque-proof connection that is designed in a detachable manner.

In order to be able to detach the torque-proof connection to the second bearing element without needing an intervention or unscrewing by personnel, it is advantageous in the design of the roller bearing system if the torque-proof connection of the bearing sleeve and the second longitudinal end of the roller bearing includes at least one spring-loaded pressure piece or thrust pad that is fastened on the bearing sleeve, and at least one molded or shaped nut, whereby for forming the torque-proof connection, the at least one spring-loaded pressure piece or thrust pad locks into the at least one nut.

The roller bearing handling system does not only serve to pull out a roller bearing that is to be demounted from the oven or to insert a roller bearing that is to be mounted into the oven. In fact, with the help of the roller bearing handling device, the roller bearing can be lifted or lowered during the dismounting and mounting of the roller bearing, in order to insert the roller bearing that is to be mounted in an accurately fitting manner in the bearing mounting or in order to prohibit the tilting of the roller bearing during the movement into or out of the oven. Accordingly the operating mode of the roller bearing handling device includes the aspect that the movement of the roller bearing during its mounting or demounting is conducted by the roller bearing handling device alone and the whole load of the roller to be exchanged is taken up by the roller bearing handling device only. Hence the invention provides in its design, that the second roller handling element is formed as a pivot which can be arranged on a first bearing element of the roller bearing that is to be handled, and that the first roller bearing handling element is intended as one that is pressing on the roller that is to be handled, and through this the roller that is to be handled is swiveling around the pivot point that is formed by the holding clamp of the second roller handling element.

An embodiment of the holding clamp of this type can realized in a manner that is specially advantageous to the design such that the first roller handling element contains at least two pressure rollers through which one of the two longitudinal ends of the roller bearing that is to be handled can be pressed down or held down. Subsequently, the first longitudinal end of the roller bearing supports itself against the pressure roller. If the roller bearing is not mounted in the second bearing element, tipping of the roller bearing is prevented through this. In fact the pressure rollers facilitate the roller bearings being kept essentially horizontal both while being taken out of and taken into the oven during demounting or mounting.

In case of an exchange of a roller bearing from the roller hearth oven, the other rollers that are located in the oven are no longer run continuously. In order to prevent the cementing of the roller bearings with the items being heat treated, the roller bearings are regularly driven or rotated for short periods of time, which is however not possible in case of the roller bearing to be demounted, since the drive connection at the first longitudinal end of this roller bearing has been disconnected. In order that the roller bearing to be demounted can nevertheless rotate till it is replaced, the invention provides in its further embodiment of the roller bearing handling device according to the invention that at least one of the two pressure rollers is a powered or driven one. To this end, the roller bearing handling device can be provided with an auxiliary drive that drives the drive or pinch roller.

In order to lift or lower or tilt the roller bearing, the invention provides in its embodiment that a height adjusting device, through which the pivot support can be pivoted around the stationary fulcrum supports the pivot support on the base support. A lifting spindle for example comes into consideration as a height adjusting device, which supports the pivot support at a position away from the pivot point and can raise or lower it, by which the pivot support swings around the pivot point, and this has the consequence that the pressure rollers ensure the pivoting of the roller bearings around the first bearing element that is mounted at the pivot point.

An easy design possibility is provided for in further embodiments of the invention, that the second roller handling element has at least one U shaped locking element that can be connected in a form-locking manner in the handling position with a cone-shaped coupling element of a roller bearing.

It is especially advantageous in this connection if a rotating mechanism that drives an adjusting drive shifts or adjusts the second roller handling element between the release position and the handling position. In the release position, the two limbs of the U-shaped locking element are moved so that the cone-shaped coupling element comes in between the limbs and abuts on the section of the locking element which joins the limbs. The locking element is then twisted, so that the two limbs of the U-shaped locking element pull the cone-shaped coupling element upon movement of the roller handling device, either away from the oven or towards it, as a result of which the roller bearing is either pulled out of the oven or the roller bearing is pushed with force so that it is pushed into the oven.

If the roller hearth oven is operated in a protective atmosphere, then in a further embodiment of the roller bearing handling device it is particularly advantageous, if the roller bearing handling device is arranged moveably in a housing that is sealed against the external environment and is designed so as to be at least partly extendable or retractable through a lock or 'sluice' in a wall of the housing. Preferably the inside of the housing can be also designed so that it can be filled with a protective atmosphere.

In an embodiment of the process, the invention then provides that upon engaging of the handling element and second roller bearing handling element the driven first longitudinal end of the roller bearing that is to be demounted is pressed vertically downwards until the second longitudinal end of the roller bearing that is to be demounted is led by the second bearing element without exerting force. Through this measure, the roller bearing that is to be demounted then allows itself to be pulled out of the roller hearth oven in an easy manner, if the first bearing element is disengaged from the side wall of the roller hearth oven. Then the first bearing element is removed from the oven with the first longitudinal end, whereas the second bearing element remains in the roller hearth oven and is not replaced.

In a further embodiment of the process, the invention provides that the roller bearing that has been pulled out of the oven is removed and the roller bearing handling device is fitted with a roller bearing that is to be mounted, in which a form-locking connection is formed between the second roller handling element and the at least one handling element of the first bearing element of the roller bearing that is to be mounted and the first longitudinal end of the roller bearing to be mounted is pressed down by the first roller bearing handling element, whereby the roller bearing handling device is then moved forward to the roller hearth furnace and the roller bearing that is to be mounted is thereby inserted into the roller hearth furnace.

Finally in a further embodiment of the invention it is provided for in the process, that before the extraction of the roller bearing that is to be demounted from the roller hearth oven, the roller hearth oven is flushed or purged with nitrogen gas and/or the temperature inside is reduced to 850° C. and preferably to 800° C. Furthermore it is advantageous if the roller bearing handling device is moved in a housing that is sealed with respect to the external environment, in order to pull the roller bearing that is to be demounted out of the roller hearth oven, in which before the pulling out of the roller bearing that is to be demounted a sluice of the housing is connected gas-tight on an opening of the roller hearth oven and subsequently the inside of the housing is flushed or purged with nitrogen gas. These measures contribute to significantly lowering the down time of the actual production process, since the roller hearth furnace does not have to be completely cooled down for replacing a roller bearing.

As an alternative, a replacement of roller bearings can also be undertaken by two roller bearing handling devices, something which can further reduce the exchange or replacement time. Accordingly the invention provides in an alternative embodiment that the roller bearing handling device, that has pulled the roller bearing that is to be demounted out of the oven, is moved laterally with respect to the oven and another roller bearing handling device, that has been mounted or fixed with a roller bearing that is to be mounted, is moved laterally along the roller hearth oven to the position of the roller bearing that is to be mounted, in which while mounting or fixing, a form-locking connection is formed between the second roller bearing handling device and the at least one bearing element of the roller bearing that is to be mounted and the first longitudinal end of the roller bearing that is to be mounted is pressed down by the roller bearing handling element.

It shall be understood that the aforementioned and following characteristics shall be applicable or utilizable not only in the respectively mentioned combination but also in other combinations or as unique characteristics, without departing from the framework of the present invention. The framework of the invention is only defined by the claims.

BRIEF DESCRIPTION OF THE DRAWINGS

Further details, characteristics and advantages of the object of the invention arise from the following description in conjunction with the drawing in which a preferred embodiment of the invention is depicted by way of example. In the drawings are shown:

FIG. 5 is a perspective view of a first bearing element, that is affixed to the housing flange of the roller hearth furnace which is replaced together with the roller bearing that is to be demounted when replacing the roller bearing, FIG. 6 is a plan or top view of a bearing cover of the first bearing element from FIG. 5, FIG. 7 is an enlarged and side sectional view of a torque-proof connection between a second bearing element and the longitudinal end of the roller bearing, FIG. 8 is an axial sectional view of the torque-proof connection from FIG. 7.

DETAILED DESCRIPTION

Figure 1:
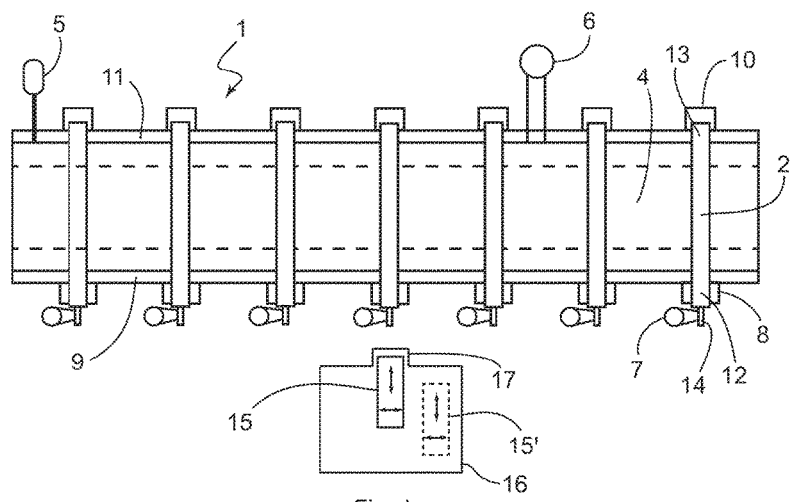
FIG. 1 shows an exemplarily depicted roller hearth oven with a carrier roller bearing system according to the invention and a roller bearing handling system according to the invention in systematic plan (top) view.
Figure 2:
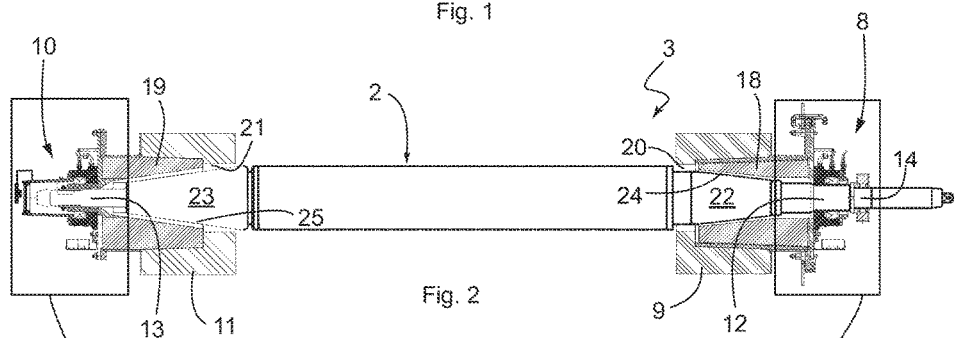
FIG. 2 shows the carrier roller bearing system in a side sectional view.

A systematic top view or plan of a roller hearth oven 1 is shown in FIG. 1 in which each of the roller bearings 2 are stored in rotatable manner by means of a carrier roller bearing system 3 in each case that is to be seen in FIG. 2 in sectional view. In the embodiment depicted in FIG. 1, the roller hearth furnace is designed and constructed for continuous heat treatment of steel straps or rolls 4. FIG. 1 is an exemplary depiction and shows only a section of the roller hearth furnace 1. For this sectional view, the roller hearth furnace 1 has seven roller bearings 2, in which only one of the seven roller bearings 2 is provided with various reference signs for reasons of clarity. The roller hearth furnace 1 is hermetically sealed from its environment and is operated in a protective atmosphere. The roller bearings 2 are arranged alongside the longitudinal axis of the roller hearth furnace 1 and transport the steel roll or strap 4, in which the process takes place at temperatures exceeding 1000° C. inside the roller hearth furnace 1. A heating unit 5 ensures maintenance of the temperature necessary for the process inside the roller hearth furnace 1, whereas a protective gas device 6 is responsible for regulating the desired protective gas atmosphere inside the roller hearth furnace 1. Each roller bearing 2 is connected outside the roller hearth furnace 1 with a drive unit 7, which drives the rotation of the respective roller bearing 2, in order to transport the steel roll or band 4 through the roller hearth furnace 1.

The carrier roller bearing system 3, that is shown in various views in FIGS. 1 to 8, includes a first bearing element 8, which is arranged on a first side wall 9 of the roller hearth furnace 1 and which must be detached from the first side wall 9 during a roller bearing replacement, and a second bearing element 10, that is arranged on the second side wall 11 of the roller hearth furnace 1 that lies on the opposite side of the first side wall 9 and which must not be detached during a roller bearing replacement from the second side wall 11. In the case of the carrier roller bearing system 3, one roller bearing 2 is in each case positioned in the roller hearth furnace with its first longitudinal end 12 by means of the first bearing element 8 and with its second longitudinal end 13 by means of the second bearing element 10 in a rotatable manner in the roller hearth furnace 1, in which the first bearing element 8 and the second bearing element 10 are designed and formed in such a gas-tight manner that no protective gas can escape from the inside of the roller hearth furnace 1. From the first longitudinal end 12 of each of the roller bearings 2, a shaft journal 14 extends or protrudes externally towards the outside from a first bearing element 8 in each case and is connected for drive purposes with an associated drive unit 7, by means of which one roller bearing 2 is rotated during the operation of the roller hearth furnace 1. During a replacement of a roller bearing 2, firstly the drive unit 7 is detached from the shaft journal 14, before the roller bearing 2 that is to be demounted is removed from the roller hearth oven 1 together with the first bearing element 8, whereas the second bearing element 10 remains in the roller hearth oven and pivots the roller bearing 2 that is to be inserted.

As FIG. 1 shows schematically, a roller bearing handling device 15 is arranged laterally along the roller hearth furnace 1, this device is moveable alongside the first side wall 9 of the roller hearth furnace 1 in order to be positioned before a roller bearing 2 that is to be demounted. For assembling, the first bearing element 8 is detached from the first side wall 9 and the roller bearing 2 that is to be replaced is removed out of the roller hearth furnace 1 together with the first bearing element 8. Additionally, the roller bearing handling device 15 is moveable towards the side wall 9 and away from it. Thus a single roller bearing handling device 15 can be used both for demounting a roller bearing 2 of the roller hearth furnace 1 as well as for installing a new roller bearing 2. It is also conceivable that a roller bearing handling device 15 is used for demounting and subsequently moved away from the oven, after which another roller bearing handling device 15' that is loaded with the roller bearing 2 that has to be installed is deployed for mounting and this is shown schematically in FIG. 1. Such a roller bearing replacement can thus take place with one or two roller bearing handling devices 15, 15' in case of a roller hearth furnace 1 that is switched off and cooled down, in which the roller hearth furnace 1 is purged or flushed with nitrogen gas before the roller bearing replacement. Earlier a roller bearing replacement in which the roller hearth furnace 1 had to be cooled down took up several days, during which in addition the entire process of heat treatment had to be halted. Hence a roller bearing replacement in which the operating conditions of the roller hearth furnace 1 are essentially maintained is desirable, during which however no impurities are allowed to reach the inside of the roller hearth furnace 1. For this reason the roller bearing replacement can be carried out only conditionally laterally along the roller hearth furnace 1, in which the operation of the roller bearing handling device 15, 15' is screened off from the outer environment. Accordingly it is obvious that the roller bearing handling device 15, 15' is operated in a sealed housing 16, so that the roller bearing replacement can on the whole take place under exclusion of the outer atmosphere. It is in such a gas-tight housing or a housing 16 that is sealed off from the external atmosphere that one or both roller bearing handling devices 15, 15' are arranged moveably and housed. Even in case of a roller bearing replacement with such a gas-tight housing 16 that is hermetically sealed from the external environment, the drive unit 7 is detached from the shaft journal 14 before the actual roller bearing 2 change. A sluice 17 of the housing 16 is provided in a wall of the housing 16, through which the housing 16 can be docked unto the roller hearth furnace 1 in a sealed manner with respect to the outer atmosphere or environment. In the process the lock or sluice 17 encloses the first bearing element 8 that is then removed out of the roller hearth oven 1 together with the roller bearing 2 that is to be demounted. In other words, either one or both of the roller bearing handling devices 15, 15' are arranged in a housing 16 that is sealed gas-tight from the outer environment and at least partially extendible out of this through the lock or sluice 17 in a wall of the housing 16, in order to have access to the roller bearing 2 that is to be demounted. After the roller hearth furnace 1 has been flushed or purged with nitrogen and the docking or coupling of the gas-tight housing 16 at the roller hearth furnace 1, the housing 16 is flushed with nitrogen, so that the atmosphere inside the housing 16 corresponds to that inside the roller hearth oven 1. The actual heat treatment process is interrupted by this flushing or purging. However in case of absolute gas-tightness of the housing 16 it is possible to carry out a roller bearing replacement even without flushing or purging and continuing the heat treatment, if the same atmosphere that is present in the roller hearth furnace 1 is produced inside the housing 16. Even if accommodated within the housing 16, the roller bearing handling device 15 or both the roller bearing handling devices 15, 15' can be moved within the housing at least in two spatial directions, as indicated by the arrow in FIG. 1. Additionally the housing 16 is moveable in at least two spatial directions, in order to pull up laterally at the desired roller bearing 2 and to draw closer to the first side wall 9 for docking. If it is not necessary for the roller bearing replacement that the replacement takes place on the first side excluding the external atmosphere, then both roller bearing handling devices 15, 15' can be placed moveably on a mobile skid.

The following embodiments of the carrier roller bearing system 3 and the roller bearing handling system 15 apply both for a roller bearing replacement excluding the outer atmosphere, that is using a gas-tight housing 16, and also if no gas-tight housing 16 is used and the exclusion of environmental atmosphere is not necessary. The carrier roller bearing system 3 according to the invention and the roller bearing handling device 15 according to the invention are deployable universally.

Figure 3:
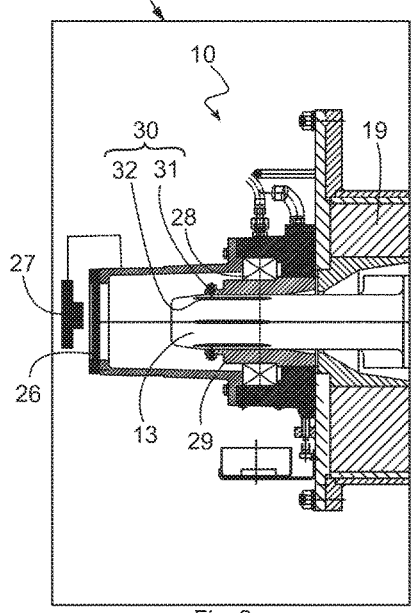
FIG. 3 is an enlarged depiction of the bearing mounting of the roller bearing at a side wall of the roller hearth oven in sectional view.
Figure 4:
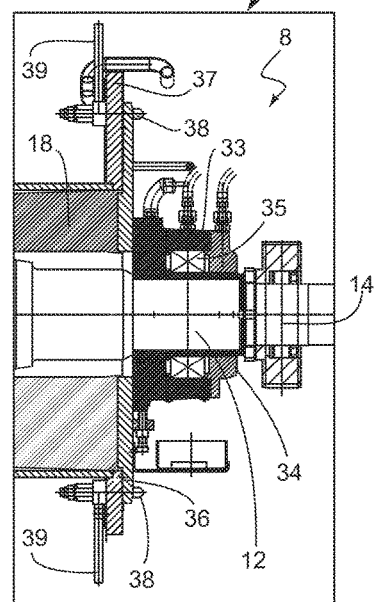
FIG. 4 is an enlarged depiction of the bearing mounting of the roller bearing at another side wall of the roller hearth oven in sectional view.

In the carrier roller bearing system 3, with reference to FIGS. 2, 3 and 4, the roller bearing 2 extends through the respective sealing plugs 18, 19 in the area of its longitudinal ends 12, 13. The seal plugs 18 and 19 themselves are placed in openings 20, 21 that are shaped or molded in the side walls 9, 11 of the roller hearth furnace 1. In the process both the seal plugs 18, 19 are arranged in the openings 20, 21 from outside. The seal plugs 18, 19 ensure that the heat radiation from within the roller hearth oven 1 does not directly radiate on the bearing elements 8 and 10. The seal plugs 18, 19 thus represent a kind of heat shield. Just like the second bearing element 10, the seal plug 19 also remains in the roller hearth furnace 1 during a roller bearing exchange. On the other hand the seal plug 18 on the side of the first bearing element 8 is demounted during roller bearing exchange together with the bearing element 8 and the roller bearing 2. A particular roller bearing 2 has conical sections 22, 23. The cross section of each roller bearing 2 tapers through these conical sections 22, 23 to its longitudinal ends 12, 13. Further, both the seal plugs 18, 19 are formed with conical openings 24, 25. The conical sections 22, 23 of the roller bearing 2 are arranged at least in sections in their assigned seal plugs 18, 19 or in their openings 24, 25. In case of a roller bearing replacement in which the roller bearing 2 is pulled out sidewise out of the roller hearth furnace 1, the seal plugs 18 is also pulled out with it, since the seal plug 18 is mechanically connected with the first bearing element 8.

FIG. 3 shows an enlarged detail view of the second bearing element 10, whereas FIG. 4 depicts an enlargement of the details of the first bearing element 8. As shown in FIG. 3, the second bearing element 10 has an inspection window 26 for visual monitoring of a roller bearing replacement. In the embodiment depicted in FIG. 3, a monitoring camera 27 has been placed at the monitoring window 26 of the second bearing element 8 for visual monitoring of the roller bearing replacement. Both the demounting as well as the mounting or installation of a roller bearing 2 can be observed with the aid of this visual monitoring option. Should it be observed through the monitoring window 26 either directly by an operator or indirectly through the monitoring camera 27 that the roller bearing 2 is not being pulled out of the roller hearth furnace 1 essentially horizontally, countermeasures can be initiated in order to align the roller bearing 2 appropriately. Further it can be checked through the monitoring window 26 during installation of a new roller bearing 2, as to whether the second longitudinal end 13 of the roller bearing 2 is coupled with a floating or moveable bearing 28 of the second bearing element 10. For the purpose of coupling, the second bearing element 10 further has a rotatable bearing sleeve 29. The bearing sleeve 29 is connected with the second longitudinal end 13 of the roller bearing 2 via a torque-proof connection 30. This torque-proof connection 30 that is formed between the bearing sleeve 29 and the second longitudinal end 13 of the roller bearing 2, is additionally depicted in FIGS. 7 and 8 and in the embodiment depicted, it includes in total six spring-loaded pressure pieces or thrust pads 31 that are affixed to the bearing sleeve 29. The torque-proof connection 30 includes moreover several nuts 32 that are molded or shaped into the second longitudinal end 13 of the roller bearing 2 and correspond in number to the number of the pressure pieces or thrust pads. For forming the torque-proof connection 30, the spring-loaded pressure pieces or thrust pads 31 latch into the assigned nuts 32. The pressure pieces or thrust pads 31 and the nuts 32 are uniformly arranged around the circumference of the bearing sleeve 29 or the second longitudinal end 13 of the roller bearing 2. Through this torque-proof connection 30 that can be released, the second longitudinal end 13 of the roller bearing 2 can be coupled in a simple manner with the floating or moveable bearing 28 since the spring-loaded pressure pieces or thrust pads 31 are first pushed away radially outwards by the second longitudinal end 13 while inserting a roller bearing 2. During rotation of the roller bearing 2, the pressure pieces or thrust pads 31 arrive in the ranges of the assigned nuts 32 and engage into these, and the torque-proof connection 30 is thus created in this way. In order to detach the torque-proof connection 30 again, the roller bearing 2 needs only to be pulled out axially out of the floating or moveable bearing 28, through which the pressure pieces or thrust pads 31 are pushed radially outwards and pushed out of the nuts 32.

In FIG. 4, the first bearing element 8 is depicted in an enlarged detail view. As can be seen, the first bearing element 8 includes a bearing housing 33 and a bearing cover 34 which is screwed on to the bearing housing 33. A fixed bearing 35 is incorporated in the bearing housing 33 for rotatable mounting of the first longitudinal end 12 of the roller bearing 2. Moreover the first bearing element 8 includes a bearing intermediate plate 36, on which the bearing housing 33 sits together with the bearing cover 34. The bearing intermediate plate 36 is at the same time the flange plate of the seal plug 18 that is affixed to it. The bearing housing 33 and the bearing cover 34 are affixed through the bearing intermediate plate 36 to a housing flange 37 that is placed on the first side wall 9 of the continuous furnace 1. When a roller bearing 2 is to be replaced, then the gas-tight screw connection, that is formed from the bearing intermediate plate 36 and the housing flange 37 is disengaged and the first bearing element 8, which includes the bearing housing 33, the bearing cover 34, the fixed bearing 35 and the bearing intermediate plate 36, is demounted together with the roller bearing 2 and the seal plugs 18 and transported away from the roller hearth oven 1. The elements for the first bearing element 8 are to be taken additionally to the depictions in the FIGS. 2 and 4 and also in the FIGS. 5 and 6. In the assembled condition, the roller bearing 2 seals the bearing intermediate plate 36 on the housing flange 37. Moreover the bearing intermediate plate 36 has the important function of providing gas-tightness during the processes for demounting and installing the roller bearing 2. Because in the first step of the demounting the drive unit 7 is removed from the shaft journal 14, so that the roller bearing handling device 15 can pull up to the roller bearing 2 that is to be demounted. If a roller bearing replacement is to be done under absolute gas-tightness, i.e. when an exchange of a roller bearing must be carried out while excluding the outer atmosphere, then the roller bearing handling instrument 15 is arranged in a gas-tight housing 16, so that the snout-shaped sluice 17 is pushed over the bearing intermediate plate 36 and lies over the housing flange 37 in a sealing manner. In order to ensure the gas-tightness at the housing flange 37 until the sluice 17 lies on it, the bearing intermediate plate 36 plugs against the housing flange 37, even when the screw connections between the bearing intermediate plate 36 and the housing flange 37 are detached. So-called sash locks 38 are provided on the upper and lower sides of the housing flange 37 for gas-tightness; these work in conjunction with the bearing intermediate plate 36 and can each be moved by means of a control lever 39 between a closed position producing sealing (see top left depiction in FIG. 5) and a release position (see top right depiction in FIG. 5). The sash locks 38 are arranged in the closed position until the sluice 17 of the housing 16 is docked in a gas-tight manner on the housing flange 37. Only after this, is the control lever 39 operated manually, so that the sash locks 38 are moved away from their closed position to the release position in which the bearing intermediate plate 36 or the whole first bearing element 8 can then be demounted from the roller hearth oven 1.

For demounting the roller bearing 2, it must be pulled out from the roller hearth oven 1. For this purpose the first bearing element 8 has a handling element 40 for handling the roller bearing 2. The handling elements 40 that are for example depicted in the FIGS. 5 and 6 can be mechanically coupled and connected in a form-locking manner with the roller bearing handling device 15 for roller bearing replacement, in order to pull out the roller bearing 2 together with the first bearing element 8 out of the roller hearth oven 1. Similarly the mechanical coupling and the form-locking connection between the handling elements 40 and the roller bearing handling device 15 serve to place the roller bearing 2 together with the first bearing element 8 into the roller hearth oven 1. Thus the mechanical coupling and the form-locking connection between the handling elements 40 and the roller bearing handling device 15 serve both to demount a roller bearing 2 that is to be replaced as well as to mount a roller bearing 2 that is to be installed. In doing so the handling elements 40 in the depicted embodiment are outside on the cone-shaped coupling element 41 molded or formed on the first bearing element 8. In the embodiment depicted, these cone shaped molded or formed coupling elements 41 are arranged diametrically with respect to each other and extend laterally radially from the first bearing element 28, essentially parallel to the first side wall 9 of the roller hearth oven 1. In particular the coupling elements 41 extend horizontally. Expressed in other words, the connecting lines of the coupling elements 41 form a horizontal plane. The coupling elements 41 have two functions. On the one hand the coupling element 41 facilitates the removal of the roller bearing 2 from the roller hearth furnace 1. On the other hand, the coupling elements 41 form a kind of axis of rotation or a pivot point about which the roller bearing 2 can be tilted, in case an adjustment is necessary while pulling out a roller bearing 2 that is to be demounted or while inserting a roller bearing 2 that is to be mounted. The actual mode of operation of the coupling elements 41 would become more apparent from the following description of the roller bearing handling device 15.

The roller bearing handling device 15 that facilitates the replacement of a roller bearing 2 of the roller hearth oven 1, is depicted in the FIGS. 10 to 15. The roller bearing handling device 15 has a base support 42, a drive equipment 43, a pivot support 44, a first roller bearing handling element 45 and a second roller handling element 46. The base support 42 is designed for movement with the help of the drive equipment 43 that is arranged on the base support 42, so that the roller bearing handling device 15 can be moved in a spatial direction towards the first side wall 9 and away from the first side wall 9 of the roller hearth furnace 1. Moreover, a pivot support 44 is placed on the base support 42, and the first roller bearing handling element 45 is arranged on the pivot support 44 itself.

The first roller bearing handling element 45 serves to lift a roller bearing 2 during its demounting or installation and in the embodiment depicted it includes two pressure rollers 47 and 48 that press on the upper side of the shaft journal 14. Since the hot roller bearing 2 in the inside of the roller hearth oven 1 and especially since the hot roller bearing 2 must be rotated in short intervals of time due to the high temperature, but the roller bearing 2 is decoupled from the drive unit 7, hence the pressure roller 48 is constructed as a drive roller that is coupled with a separate drive 49. Thus the drive 49 ensures that the roller bearing that is to be demounted is rotated in short intervals of time in order to avoid for example that the roller bearing 2 gets stuck with the steel roll 4. In doing so the roller bearing handling element 45 doesn't lift or both the pressure rollers 47, 48 do not lift the roller bearing 2 that is to be handled (for demounting or installing), but press on the shaft journal 14 or press it down (see for example FIG. 11).

Figures 9, 10, 11:
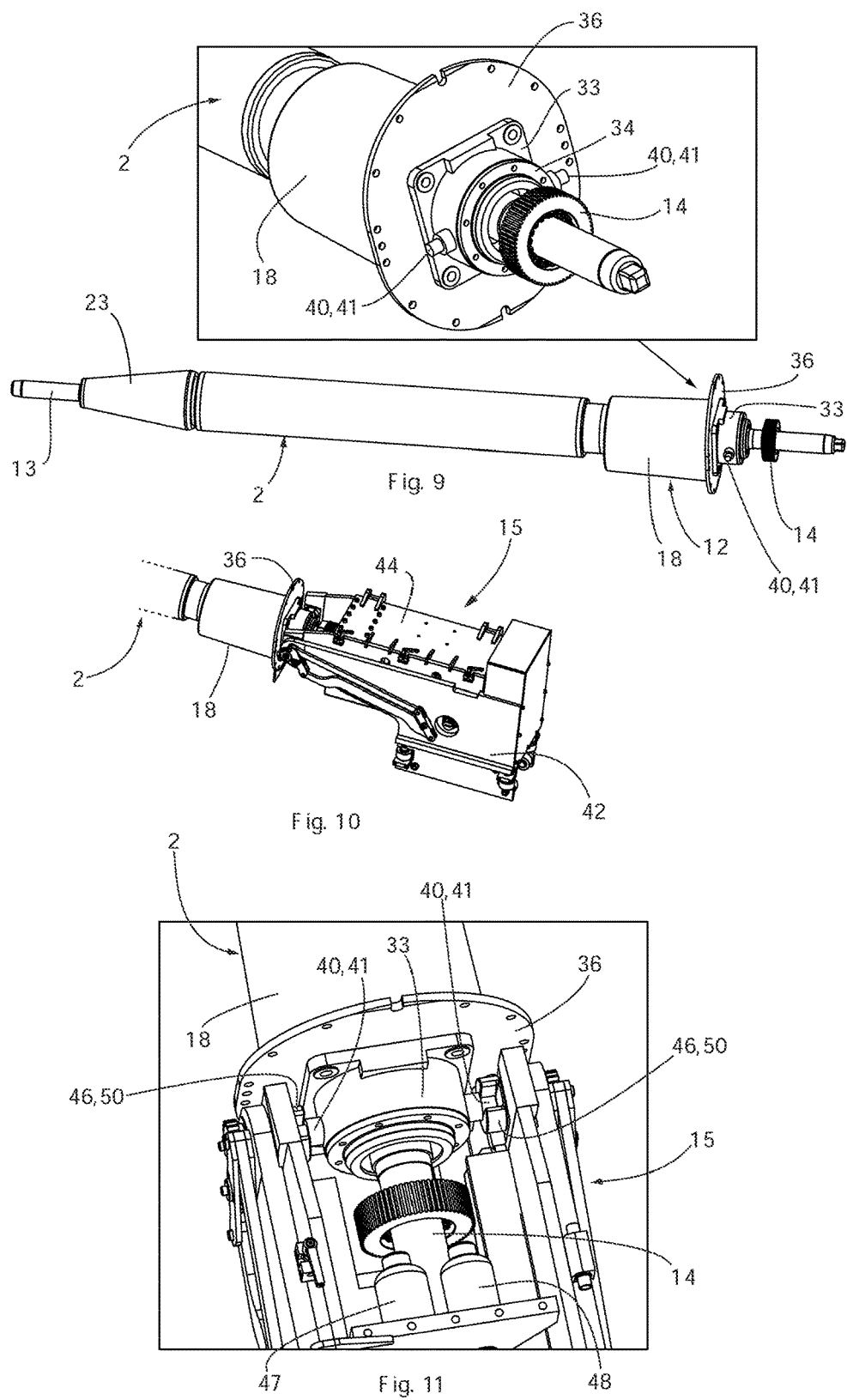
FIG. 9 is a perspective view of a roller bearing with the first bearing element fixed on it.
FIG. 10 depicts a roller bearing handling device with a roller bearing demounted from the roller bearing oven together with the first bearing element in perspective view.
FIG. 11 is an enlarged detail depiction of the roller bearing handling device with the roller bearing coupled with it in plan or top view.
Figure 12:
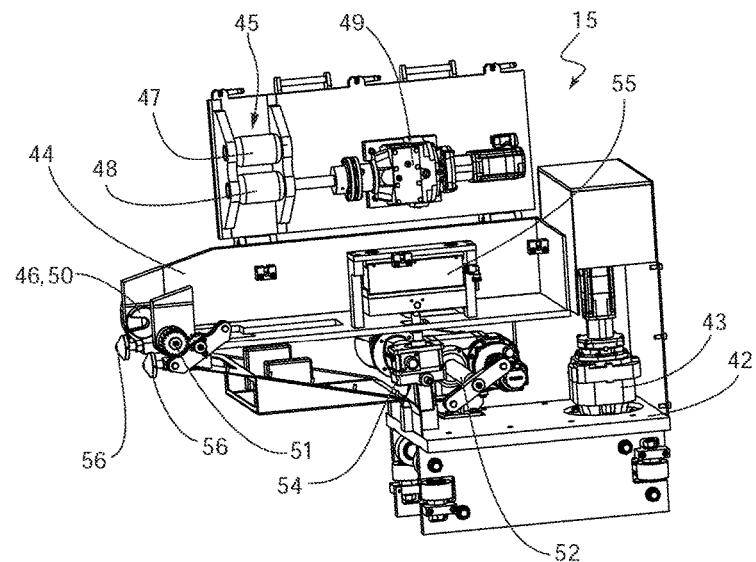
FIG. 12 is a perspective view of the roller bearing handling device and its various component parts.
Figure 13:
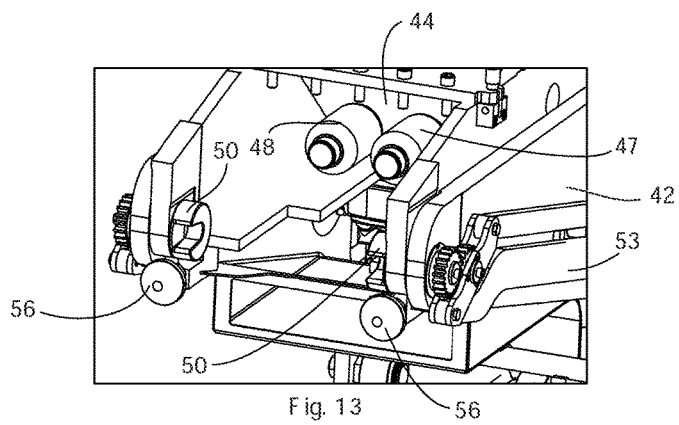
FIG. 13 is an enlarged view of a first and second roller bearing handling element of the roller bearing handling device.

The second roller bearing element 46 serves as a kind of counter bearing to the force brought to press down the first roller bearing element 45, something which is evident from the FIGS. 11, 12 and 13. The second roller bearing handling element 46 is arranged on the base support 42 and can be adjusted between a handling position and a release position. In the handling position, which for example is shown in FIG. 11, the second roller handling element 46 is mechanically coupled and connected in a form-locking manner with the roller bearing 2 for roller bearing replacement. The release position, in which the mechanical coupling and form-locking connection between the roller bearing 2 and the second roller bearing handling element 46 is released, is depicted in FIGS. 12 and 13. As is evident from the figures, the second roller bearing handling element 46 has two locking elements 50 that are U shaped (see or example FIG. 13). The two U-shaped locking elements 50 are arranged horizontal with respect to an imaginary connecting line and spaced apart from each other in such a way that in the release position, they take in the cone-shaped coupling elements 41 of the first bearing element 8 between their two limbs till the respective coupling elements 41 lie on the corresponding connection bridge of the two limbs of the U-shaped locking element 50. In this position the locking elements 50 are then rotated on the base support 42 with respect to the stationary pivot point 51, so that the slit-shaped opening of the U-shaped locking element 50 points in the vertical direction, as shown in the FIG. 11. The locking element 50 actually has a disc-shaped design, in which the slit-shaped opening imparts a U-shaped appearance to the locking element 50. An adjustment drive 52 that is placed on the base support 42 and is movably coupled via a rod-shaped rotating mechanism 53 with the second roller bearing handling element 46 is provided for the displacement or adjustment of each locking element 50 around a respective rotation point 51, so that a movement of the rotation mechanism 53 displaces or adjusts the second roller bearing handling element 46 between a release position and a handling position.

Figure 14:
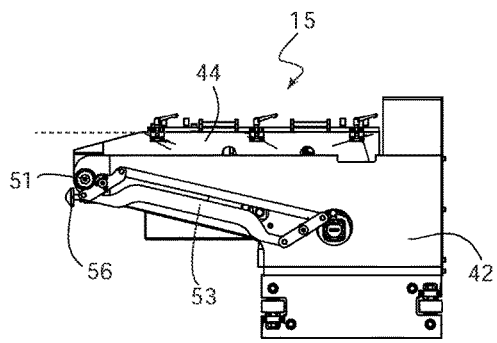
FIG. 14 shows a side view of the roller bearing handling device according to the invention in home position and FIG. 15 shows a side view of the roller bearing handling device according to the invention in home position in a position for a lifted roller bearing.
Figure 15:
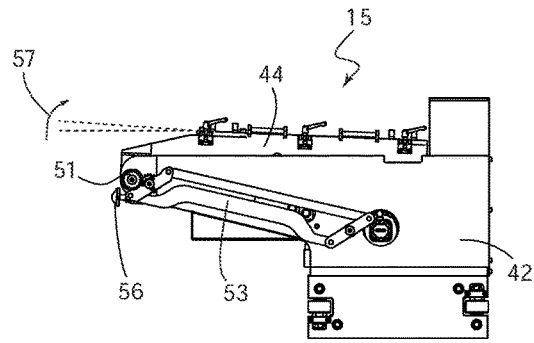

The force with which the first roller bearing handling element 45 presses on the shaft journals 14, must be so measured that a transmission of power (traction) predominates between the pressure rollers 48 that are driven and the shaft journal 14, in order to drive the roller bearing 2. An initiator at the end of the roller bearing pin monitors as to whether the roller bearing 2 rotates along with the pressure roller 48. If the roller bearing 2 does not rotate along with it, the pressing force of the pressure roller 48 can be increased manually by an operator. However care is to be taken to ensure that the pressing force applied does not exceed a limit since the roller bearing pins can get distorted at very high pressure. Hence a pressure load cell 55 is provided for monitoring; this is exemplarily shown in FIG. 12 and in the embodiment arranged on the pivot support 44. Hence, for increasing (or decreasing) the pressing force, the pivot support 44 must be lowered together with the pressure rollers 47, 48, and this takes place with the help of the height adjusting device 54. The height adjusting device 54 is a lifting spindle that is arranged on the base support 42 and lifts or lowers the pivot support 44, in order to change the effective force acting on the shaft journal 14 through the pressure rollers 47, 48. The height adjusting device 54, which is directly attached to the pressure load cell 55, consequently props up the pivot support 44 on the base support 42. Thus lifting or lowering the pivot support 44 by the height adjusting device 54 leads to the pivot support 44 being swiveled about the pivot point 51. A lowered position of the pivot support 44 from a ground position depicted in FIG. 14 is shown in FIG. 15, in which the swiveling about the pivot point 51 is shown through dotted lines and the arrow 57.

Hence in the design and construction of the roller bearing handling elements 45, 46 of the roller bearing handling device 15, the second roller bearing handling element 46 is formed as a pivot point 51 for the roller bearing 2 that is to be handled which can be arranged on the first bearing element 8 of the roller bearing 2 that is to be handled, in which the first roller handling element 45 is formed as one that presses on the roller bearing to be handled 2 and thereby as a pressure pad that pivots the roller bearing 2 about the pivot point 51 formed by the second roller handling element 46, which ensures that the first longitudinal end 12 of the roller bearing 2 that is to be demounted is pushed downwards vertically by the first roller handling element 46 to such an extent that the second longitudinal end 13 of the roller bearing that is to be demounted 2 is only powerlessly guided or conducted by the second bearing element 10.

Moreover in the embodiment depicted, the roller bearing handling device 15 has two spacer bolts 56 that facilitate the vertical positioning of the bearing element 8 during demounting and installation of a roller bearing 2. The spacer bolts 56 are arranged on the frame of the base support 42 and are vertically displaced from both the locking elements 50; they prevent tilting or tipping of the carrier roller bearing or the first bearing element 8 and the seal plug 18 when the roller bearing 2 is being handled.

In respect of the following process described, it shall be noted that the description is indeed made for a replacement of roller bearing 2 in whose case the roller bearing handling device 15 (and 15' if applicable) is (are) arranged in a gas-tight housing 16 that is sealed off from the surrounding external environment or atmosphere and is (are) operated. However, using the roller bearing handling device 15 is naturally possible without such a housing 16 also, should the roller bearing replacement take place for a roller hearth furnace 1 that has been sufficiently cooled down an in whose case the process of heat treatment of work pieces has been discontinued for the duration of the maintenance and/or the roller bearing replacement. Naturally there are individual steps that also belong to the process that have already been mentioned in connection with the description of the design and construction characteristics.

With the housing 16 depicted in FIG. 1, the roller bearing handling device 15 (and 15' if applicable) have the task of implementing a roller bearing replacement in an industrial furnace or oven or roller hearth furnace 1 that is still at a high temperature. In the process according to the invention for replacement of roller bearings 2 of the roller hearth furnace 1, the carrier roller bearing system 3 described above and the roller bearing handling system 15 (and 15' is applicable) described above are used, in which the roller bearing handling system 15 is moved laterally near the roller hearth furnace 1 to the position of the roller bearing 2 that is to be demounted in a first step, in which thereafter or at the same time the drive unit 7 is decoupled from the shaft journal 14 of the roller bearing 2 that is to be demounted and the fastening of the first bearing element is detached from the roller hearth furnace 1. Subsequently the roller bearing handling device 15 is moved towards the roller bearing 2 that is to be demounted, so that the sluices 17 of the gas-tight housing 16 take up the first bearing element 8 and it can dock gas-tight on the first side wall 9 of the roller hearth furnace 1. As soon as the lock or sluice 17 lies gas-tight on the housing flange 37, the sash locks 38, that were ensuring gas-tightness hitherto, can be manually moved by means of the control lever 39 by an operator, in order that the sash lock 39 is transported from the closed position to the release position, so that the bearing element 8 can be demounted from the roller hearth furnace 1. For the purpose of demounting, a form-locking connection is formed between the second roller handling element 46 and the handling element 40 of the first bearing element 8 of the roller beating 2 that is to be demounted. Before the roller bearing 2 is pulled out of the roller hearth oven 1, the temperature is taken to a maximum of 800° C. and the roller hearth furnace 1 is flushed with nitrogen. For reasons of safety, all roller bearings 2 of the roller hearth furnace 1 are rotated every 15 seconds, whereby in the case of the roller bearing 2 that is to be demounted the driven pressure roller 48 has been provided for this purpose. Upon engaging the handling element 40 and the second roller handling element 46, the driven first longitudinal end 12 of the roller bearing 2 that is to be demounted 45 is pressed vertically downwards to such an extent that the second longitudinal end 13 of the roller bearing 2 that is to be demounted is led or guided by the second bearing element 10 only powerlessly. Subsequently the roller bearing handling device 15 is moved away from the roller hearth furnace 1, so that the roller bearing 2 that is to be demounted is pulled out of the roller hearth furnace 1. The roller bearing 2 that has been pulled out of the roller hearth furnace 1 is then removed from the carrier roller bearing handling element 15, in which the roller bearing 2 is demounted together with its first bearing element 8. Subsequently the roller handling device 15 is fitted with a roller bearing 2 that is to be mounted; this roller bearing 2 is provided with a new bearing element 8. While fitting, a form-locking connection is once again established between the second roller handling element 46 and the (at least one) handling element 40 of the first bearing element 8 of the roller bearing 2 that is to be installed, in which the first longitudinal end 12 of the roller bearing 2 that is to be mounted is pushed downwards by the first roller bearing handling element 45. The roller handling device 15 is then moved again towards the roller hearth furnace 1 and the roller bearing 2 that is to be installed is in the process inserted into the roller hearth furnace 1.

Alternatively, the roller bearing handling device 15, which has demounted the roller bearing 2 that is to be demounted and its first bearing element 8 from the roller hearth furnace 1, can be moved laterally along the roller hearth furnace 1. Another roller bearing handling device 15', that is mounted with the roller bearing 2 that is to be installed together with a new bearing element 8, can be moved laterally along the roller hearth furnace 1 to the position of the roller bearing 2 that is to be mounted, in which a form-locking connection is formed between the second roller bearing handling element 46 and the handling element 40 of the first bearing element 8 of the roller bearing 2 that is to be installed while mounting, and the first roller bearing handling element 45 presses down the first longitudinal end 12 of the roller bearing 2 to be mounted, in order to insert the roller bearing 2 essentially horizontally into the roller hearth oven 1.

In summary, the present invention is focused both on the carrier roller bearing system 3 as well as on the roller bearing handling device 15 that is intended for replacement of roller bearings 2 of the carrier roller bearing system 3. The carrier roller bearing system 3 according to the invention includes the first bearing element 8, the second bearing element 10 and the roller bearing 2, from whose first longitudinal end 12 the shaft journals 14 that are driven extend outwards. For roller bearing exchange, the roller bearing 2 is demounted together with the first bearing element 8 and is replaced by a new roller bearing 2 with a new first bearing element 8. The roller bearing 2 and its first bearing element 8 form the assembly or element that is to be exchanged, both during the demounting and also during the installation as one contiguous and firmly fixed entity or unit. For the purpose of roller bearing exchange, the first beating element 8 has a handling element 40 for handling the roller bearing 2. The handling element 40 is formed in a cone-shaped manner and is designed in a manner compatible with the carrier roller bearing handling device 3 according to the invention so that the carrier roller bearing handling device 3 can be coupled mechanically and connected in a form-locking manner with the handling element 40, in order to pull the roller bearing 2 together with the first bearing element 8 out of the roller hearth furnace 1 or to insert the roller bearing 2 together with the first bearing element 8 into the roller hearth furnace 1. In this respect the carrier roller handling device 15 according to the invention has the frame-type base support 42, the pivot support 44 that is likewise frame-shaped which is arranged on the base support 42 and the first roller handling element 45. The pivot support 44 is rotatable relative to the base support 42 around a pivot point 51, in which the second roller bearing handling element 46 is arranged on the base support 42, and this second roller bearing handling element 46 is designed so as to be moved between a handling position in which the second roller handling element 46 can be mechanically coupled and connected in a form-locking manner with the roller bearing 2 and a release position. The movement of the roller bearing 2 that is to be demounted or is to be installed is conducted with the help of the roller bearing handling elements 45, 46 in which the carrier roller bearing handling device takes up the entire load of the roller beating 2. Swiveling of the pivot support 44 relative to the base support 42 leads to the condition that in addition the first roller bearing handling element 45 is swiveled relative to the second roller bearing handling element 46, in which the second roller bearing handling element 46 is arranged stationary on the base support 42 and on the pivot point 51.

The specialist would identify, that the roller bearing handling device 15' is already mounted with a new roller bearing 2 when it is arranged in a moveable manner in a housing 16 that is sealed off from the external environment much before the beginning of the whole action of the roller bearing replacement, since the atmosphere is to be changed for the first time once with the docking of the housing 16 at the roller hearth furnace 1 and before the dismantling of the first roller bearing 2. The housing 16 of the carrier roller bearing handling device can, according to this procedure, no longer be opened, unless one interrupts the roller bearing replacement procedure.

Likewise the specialist would realize that in case of a roller bearing exchange or replacement with a housing 16 that is sealed off from the outer environment, the roller bearings must be rotated continuously during the removal from the furnace as well as during the insertion into the furnace since the conical piece 23 is located on the roller bearing. The conical piece 23 facilitates the slight lifting of the production line during the exit motion and the roller can shuttle under the line without tearing or damaging the line while doing so. The same applies to the entry motion of the new roller bearing. Since the old roller bearing is pulled out of the furnace, the production line now sags deeper due to the larger distance between the roller bearings. The new roller bearing that is to come in can now move under the line with the second longitudinal end 13 and the line is lifted higher with the conical piece 23 and thus the damaging or tearing of the production line is impeded. However the roller bearing must always rotate or be in rotation.

The invention described above is naturally not limited to the embodiments described and depicted. It is obvious that in the embodiment depicted in the drawing numerous manifest or self-evident alterations or modifications can be undertaken according to the intended usage according to the specialist, without thereby egressing from the realm of the invention. To the invention belongs all that which is contained in the description and/or depicted in the drawing, including that which deviates from the concrete embodiment and is self-evident or manifest for the specialist.

The invention claimed is:

1. A roller bearing handling system for replacement or exchange of a roller bearing of a roller hearth furnace comprising:
    a base support,
    a pivot support arranged on the base support, and
    a first roller bearing handling element that is arranged or placed on the pivot support and which can lift a roller bearing,
    wherein the pivot support is arranged on the base support and is able to swivel about a stationary pivot point relative to the base support,
    a second carrier roller bearing handling element is arranged on the base support for the purpose of handling a roller bearing, and is able to be adjusted between a handling position, in which the second roller bearing handling element can be mechanically coupled and connected in a form-locking manner with the roller bearing for roller bearing replacement and a release position in which the mechanical coupling and form-locking connection between the roller bearing and the carrier roller bearing handling element is released,
    wherein the second roller bearing handling element has at least one U-shaped locking element, which is designed to be connected in a form-locking manner with a cone-shaped coupling element of a roller bearing in the handling position.

2. The roller bearing handling device according to claim 1, wherein the second roller handling element is designed as a pivot point that is arranged or placed on the first bearing element of a roller bearing that is to be handled and the first roller handling element is designed as one which presses on the roller bearing that is to be handled and thus the roller bearing that is to be handled is able to pivot around the pivot point formed by the holding clamp of the second roller bearing handling element.

3. The roller bearing handling device according to claim 1 wherein the first roller bearing handling element has at least two pressure rollers through which the first longitudinal end of a roller bearing that is to be handled can be pressed down or held down.

4. The roller bearing handling device according to claim 3, wherein at least one of the two pressure rollers is a drive roller.

5. The roller bearing handling device according to claim 1, wherein a height adjusting device by which the pivot support can be pivoted around the stationary pivot point props up the pivot support on the base support.

6. The roller bearing handling device according to claim 1, wherein a rotating mechanism that powers an adjusting drive adjusts the second roller bearing handling between the release position and the handling position.

7. The roller bearing handling device according to claim 1, wherein the roller bearing handling device can be moved in a housing that is sealed off from the external environment and can be moved out at least partly from the housing through a sluice that is placed on the housing.

8. A roller bearing handling system for replacement or exchange of a roller bearing of a roller hearth furnace comprising:
    a base support,
    a pivot support arranged on the base support, and
    a first roller bearing handling element that is arranged or placed on the pivot support and which can lift a roller bearing,
    wherein the pivot support is arranged on the base support and is able to swivel about a stationary pivot point relative to the base support,
    a second carrier roller bearing handling element is arranged on the base support for the purpose of handling a roller bearing, and is able to be adjusted between a handling position, in which the second roller bearing handling element can be mechanically coupled and connected in a form-locking manner with the roller bearing for roller bearing replacement and a release position in which the mechanical coupling and form-locking connection between the roller bearing and the carrier roller bearing handling element is released,
    wherein a rotating mechanism that powers an adjusting drive adjusts the second roller bearing handling between the release position and the handling position.

9. The roller bearing handling device according to claim 8, wherein the second roller handling element is designed as a pivot point that is arranged or placed on the first bearing element of a roller bearing that is to be handled and the first roller handling element is designed as one which presses on the roller bearing that is to be handled and thus the roller bearing that is to be handled is able to pivot around the pivot point formed by the holding clamp of the second roller bearing handling element.

10. The roller bearing handling device according to claim 8 wherein the first roller bearing handling element has at least two pressure rollers through which the first longitudinal end of a roller bearing that is to be handled can be pressed down or held down.

11. The roller bearing handling device according to claim 10, wherein at least one of the two pressure rollers is a drive roller.

12. The roller bearing handling device according to claim 8, wherein a height adjusting device by which the pivot support can be pivoted around the stationary pivot point props up the pivot support on the base support.

13. The roller bearing handling device according to claim 8, wherein the second roller bearing handling element has at least one U-shaped locking element, which is designed to be connected in a form-locking manner with a cone-shaped coupling element of a roller bearing in the handling position.

* * * * *